(12) United States Patent
Hobbs

(10) Patent No.: US 12,704,199 B2
(45) Date of Patent: Aug. 11, 2026

(54) VALVE DEVICE

(71) Applicant: KOHLER MIRA LIMITED, Cheltenham (GB)

(72) Inventor: Barry Hobbs, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 0 days.

(21) Appl. No.: 18/776,725

(22) Filed: Jul. 18, 2024

(65) Prior Publication Data

US 2025/0027580 A1 Jan. 23, 2025

(30) Foreign Application Priority Data

Jul. 21, 2023 (GB) ..................................... 2311259

(51) Int. Cl.

*F16K 17/04* (2006.01)
*B05B 1/16* (2006.01)
*F16K 39/02* (2006.01)

(52) U.S. Cl.

CPC .......... *F16K 39/026* (2013.01); *B05B 1/1609* (2013.01); *F16K 17/048* (2013.01); *F16K 2200/402* (2021.08); *Y10T 137/7766* (2015.04)

(58) Field of Classification Search

CPC ........................ Y10T 137/7766; F16K 17/048
See application file for complete search history.

(56) References Cited

U.S. PATENT DOCUMENTS 3,478,776 A * 11/1969 Royer ................ G05D 16/0655 137/491
4,535,805 A * 8/1985 Mertz .................. F16K 31/402 251/30.01
8,186,327 B2 * 5/2012 Ni ........................... F01M 1/16 123/196 S
9,458,612 B2 * 10/2016 Thomas .............. F16K 31/0675
10,704,701 B1 * 7/2020 Yu ........................ F16K 27/0209
2017/0087563 A1 * 3/2017 Lin ......................... F16K 3/267

* cited by examiner

*Primary Examiner* — Kevin F Murphy
(74) *Attorney, Agent, or Firm* — Husch Blackwell LLP

(57) ABSTRACT

A valve device includes an inlet, an outlet connected to the inlet, a valve member having an open position in which fluid can pass from the inlet to the outlet, and a closed position in which fluid cannot pass from the inlet and the outlet, and an actuator. The actuator selectively actuates the valve member, and has an open actuator position and a closed actuator position. The valve has a first operating mode in which, over a whole of the range of operating values of the inlet pressure, the actuator is fixed in the open actuator position and the valve member is in the open valve position. In a second operating mode, the actuator switches from the closed actuator position to the open actuator position, switching the valve member from the closed valve position to the open valve position, when the inlet pressure exceeds a second threshold inlet pressure.

24 Claims, 9 Drawing Sheets

| Operating Mode | Inlet Pressure | Flow via First Fluid Flow Path | Flow via Second Fluid Flow Path |
|---|---|---|---|
| First | > 0 | yes | yes |
| Second | ≤1st threshold inlet pressure | no | no |
| | >1st threshold inlet pressure, ≤2nd threshold inlet pressure | no | yes |
| | >2nd threshold inlet pressure | yes | yes |

VALVE DEVICE

CROSS-REFERENCE TO RELATED APPLICATIONS

This application claims priority to UK Patent Application No. 2311259.2, filed 21 Jul. 2023, the entirety of which is hereby incorporated by reference.

FIELD OF THE INVENTION

This disclosure relates to a valve device, in particular but not exclusively, for use in a fluid delivery device, in particular, by not exclusively, in a spray head such as in a showerhead or a faucet. The disclosure also relates to a fluid delivery device comprising one or more such valve devices. The disclosure also relates to a method of operating a fluid delivery device.

BRIEF DESCRIPTION OF THE DRAWINGS

Example embodiments will now be described with reference to the accompanying drawings, in which.

DETAILED DESCRIPTION OF THE DRAWINGS

In the showering industry, solenoid valves are utilised for on/off switching of water flow. Many of these valves may be used in combination within a spray head to allow switching between different spray modes.

When a solenoid valve is in an off position, a build-up of pressure can occur upstream of the valve. If this pressure becomes too great it may damage the spray head causing leaks and other undesirable effects. If many or all of the solenoid valves of a spray head are in the off position, they may act as a blockage causing mains water pressure to build up in the spray head and the supplying pipework. As a result, higher grade materials and more robust components may need to be employed in these areas than would otherwise be required. This increase in material requirements may have a negative environmental impact and/or may be associated with increased cost.

Furthermore, such conventional solenoid valves may have increased maintenance demands. For conventional solenoid valves, the inlet pressure acts to push the valve member closed. As such, once a sufficient inlet pressure has built up behind a valve in the off position, it may then be difficult or impossible to overcome the inlet pressure to switch the valve to the open position. In these situations the valves are said to be stuck in the closed position and it may be necessary to manually relieve the pressure (e.g., by disconnecting the valve from the system) to allow the valve to open.

Figure 1:
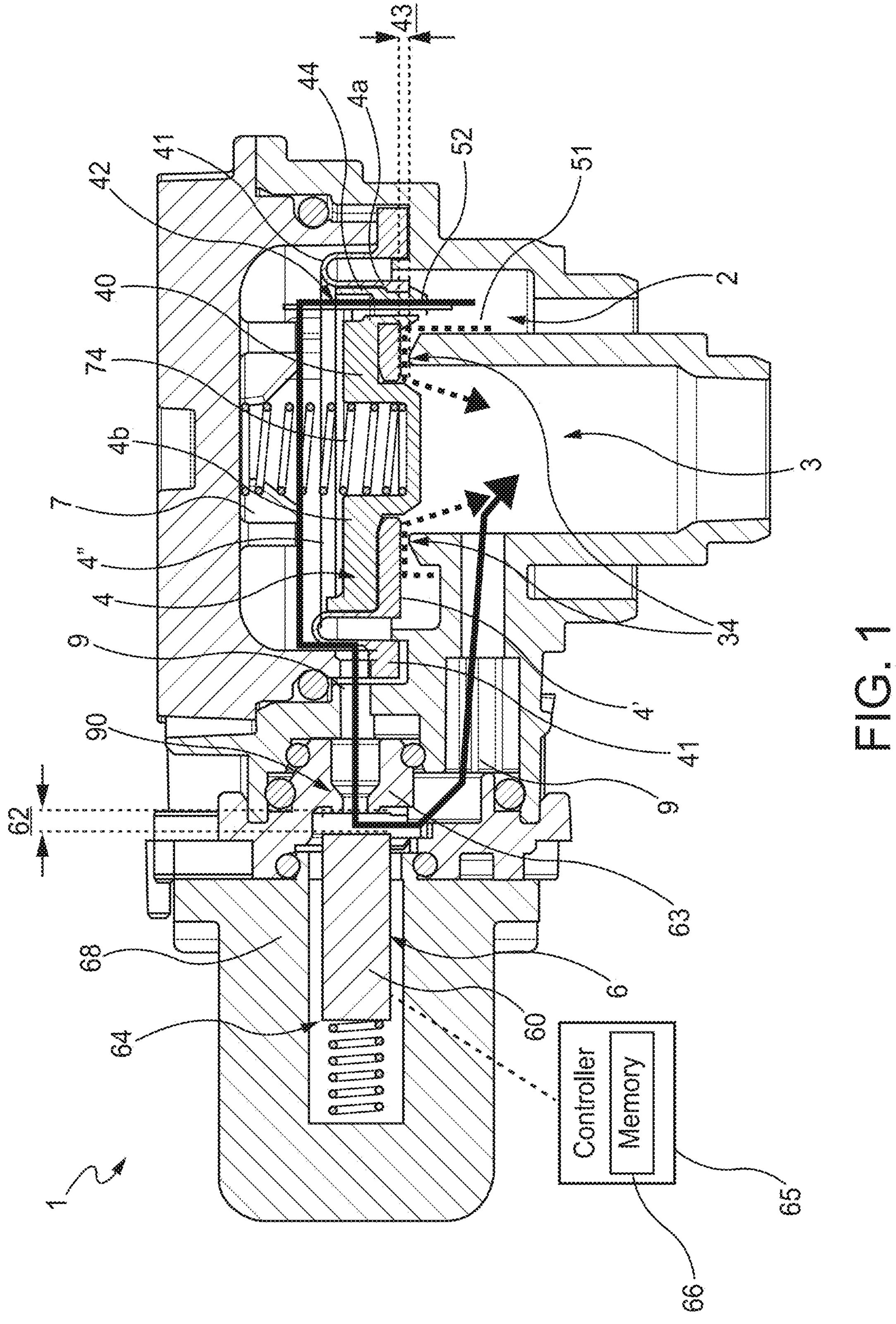
FIG. 1 illustrates a cross-section of an example valve device in a first operating mode.

FIG. 1 shows a valve device 1 for use in a fluid delivery device such as in an ablutionary or plumbing apparatus. The valve device 1 comprises an inlet 2 for receiving fluid from a fluid supply (not shown). Fluid flow within the inlet 2 is characterised by an inlet pressure. The valve device 1 is operable over a range of operating values of the inlet pressure. The valve device 1 further comprises an outlet 3 which is selectively fluidically connected to the inlet 2. In this example, both the inlet 2 and the outlet 3 are generally tubular and the inlet 2 has an annular shape and surrounds a circumference of the outlet 3.

The valve device 1 includes a valve member 4 which selectively enables fluidic connection between the inlet 2 and the outlet 3. An end of the outlet 3 facing the valve member 4 defines a valve seat 34 configured to cooperate with a front surface 4' of the valve member 4. The valve member 4 comprises a translatable plate 40 supported around its perimeter by a flexible sheet 41. The flexible sheet 41 is coupled to the translatable plate 40 and an end of the inlet 2 proximal to the valve member 4.

The valve device 1 further comprises a chamber 7 adjacent to the valve member 4. In this example, a rear surface 4" of the valve member 4 (a rear surface of the flexible sheet 41 and the translatable plate 40), opposite the front surface 4', defines a boundary of the chamber 7. The flexible sheet 41 and the translatable plate 40 are substantially impermeable to fluid from the fluid supply. The flexible sheet 41 seals the end of the inlet 2 and translatable plate 40 together preventing fluid passing from the inlet 2 to the chamber 7 in between the flexible sheet 41 and the translatable plate 40.

The chamber 7 is fluidically connected to the inlet 2 by a channel 42. In this arrangement, the channel 42 consists of a through thickness aperture in the translatable plate 40. The channel 42 allows fluid from the inlet 2 to flow into the chamber 7. Fluid within the chamber 7 is characterised as having a 'chamber pressure' which represents the fluidic pressure of the fluid within the chamber 7.

The inlet pressure acts on a first effective area *4a* of the front surface 4' of the valve member 4 resulting in an inlet pressure force. Similarly, the chamber pressure acts on a second effective area of the rear surface 4" of the valve member 4 resulting in a chamber pressure force which acts to oppose the inlet pressure force. As shown n FIG. 1, the first and second effective areas *4a*, *4b* may be measured as contact areas perpendicular to a direction of translation of the translatable plate 40. Where there is a difference between magnitudes of the inlet pressure force and the chamber pressure force, a (non-zero) pressure differential force is said to act on the valve member 4.

The valve member 4 has multiple operating positions including an open valve position and a closed valve position. The pressure differential force determines the operating position of the valve member 4.

In FIG. 1, the valve member 4 is shown in the open valve position. As shown, when the valve member 4 is in the open valve position, there is a gap 43 between the front surface 4' of the valve member 4 and the valve seat 34. The gap 43 enables fluidic connection between the inlet 2 and the outlet 3 as shown schematically in FIG. 1 by dotted arrows. This represents a first flow path 51 by which the inlet 2 is selectively fluidically connected to the outlet 3.

The valve device 1 further comprises a conduit 9 which selectively fluidically connects the chamber 7 to the outlet 3. Together the channel 42, the chamber 7 and the conduit 9 define a second flow path 52 by which the inlet 2 is selectively fluidically connected to the outlet 3.

The valve device 1 further comprises an actuator 6, for selectively actuating the valve member 4 between the open valve position and the closed valve position. As will be described below, this actuation is achieved through varying a pressure differential between the chamber pressure and the inlet pressure.

The actuator 6 is an electromagnetically controlled part having an open actuator position, a partially open actuator position and a closed actuator position. The actuator 6 comprises an armature 60, an armature seat 63 and a solenoid 68. The armature 60 is a moveable element arranged to selectively block and unblock the conduit 9.

The armature 60 is operably connected to a resilient member. In this example, the resilient member comprises a coil spring 64. The actuator 6 is configured such that the resilient member, e.g. the coil spring 64, is in compression. This compression generates a reaction force in the coil spring 64 which acts to move the armature 60 towards the armature seat 63. The actuator 6 is arranged such that when the solenoid 68 is energised, the electromagnetic force of the solenoid 68 on the armature 60 acts to oppose the reaction force of the coil spring 64. The position of the armature 60 is determined by the balance of forces acting on the armature 60.

The valve device 1 further comprises a controller 65 operable to switch between operating modes of the valve device 1. The controller 65 is wirelessly connected to the actuator 6 and operable to switch the solenoid 68 on (first operating mode of the valve device 1) and off (second operating mode of the valve device 1).

In this example, the controller 65 is a digital controller which includes a memory 66 operable to store operating mode switching data. For example, the switching data may represent a pattern of switching over time. Each pattern may be associated with a different spray mode of a fluid delivery device in which the valve device 1 may be installed. The controller 65 may be operable to select a pattern on the basis of additional data such as temperature, time of day and/or identification data. For example, the controller 65 may be programmed to run a specific switching pattern when a specific user has been identified and a specific spray mode has been selected.

In FIG. 1, the valve device 1 is shown in a first operating mode. The first operating mode may correspond to a user demand for an open valve. In this implementation, the first operating mode is characterised in that the solenoid 68 is energised such that the electromagnetic force exceeds the reaction force of the coil spring 64 resulting in a separation 62 between the armature 60 and the armature seat 63. The separation 62 enables fluidic connection between the inlet 2 and the outlet 3 via the second flow path 52. In this state, the armature 60 does not block the conduit 9 and the actuator 6 is said to be in the open actuator position.

The actuator 6 is operable to selectively actuate the valve member 4 between the open valve position and the closed valve position by varying the differential fluid pressure on either side of the valve member 4. When the valve device 1 is in the first operating mode, the actuator 6 is in the open actuator position (as described above). Considering the second flow path 52, fluid flows from the inlet 2 into the chamber 7 via the channel 42. This flow is then directed along the conduit 9 (past the armature 60) to the outlet 3.

In this example, the conduit 9 comprises a reduced area portion 90. The reduced area portion 90 has the minimum cross-sectional area of the conduit 9. The channel 42 comprises a further reduced area portion 44. The further reduced area portion 44 has the minimum cross-sectional area of the channel 42. The reduced area portion 90 has a larger cross-sectional area than the further reduced area portion 44.

The minimum cross-sectional area of the conduit 9 is larger than the minimum cross-sectional area of the channel 42. As a result, the chamber pressure behind the valve member 4 (i.e., in the chamber 7) is less than the inlet pressure which acts on the front surface 4' of the valve member 4. This pressure imbalance creates a pressure imbalance force which acts to move the valve member 4 away from the valve seat 34. As a result, when the actuator 6 is in the open actuator position the valve member 4 is pushed into the open valve position. This is the case at all (non-zero) operating values of the inlet pressure. As such, when the valve device 1 is in the first operating mode, fluid is output from the outlet 3 as the inlet 2 is fluidically connected to the outlet 3 via the first flow path (and independently via the second flow path).

In this example, the valve device 1 further comprises a resilient member. As will be described later in the description, the resilient member ensures complete sealing between the valve member 4 and the valve seat 34 when the valve member 4 is in the closed valve position. In this example, the resilient member is a spring 74 which extends across the chamber 7. The spring 74 is coupled to the rear surface 4" of the valve member 4 and a perimeter of the chamber 7 and provides a resilient force which acts to bias the valve member 4 towards the valve seat 34. The balance of forces between the pressure differential force and the resilient force of the spring 74 determines the operating position of the valve member 4. The resilient force of the spring 74 is significantly smaller than and overcome by the pressure imbalance force when the valve device 1 is in the first operating mode.

It will be appreciated that the spring 74 is merely an example and that many suitable alternative resilient members exist. For instance, the resilient force may be provided by the flexible membrane 41. In an alternate arrangement, the resilient member may be omitted altogether.

Upon receiving a user demand for a closed valve, the controller 65 may switch the operating mode of the valve device 1 from the first operating mode to the second operating mode.

Figure 2:
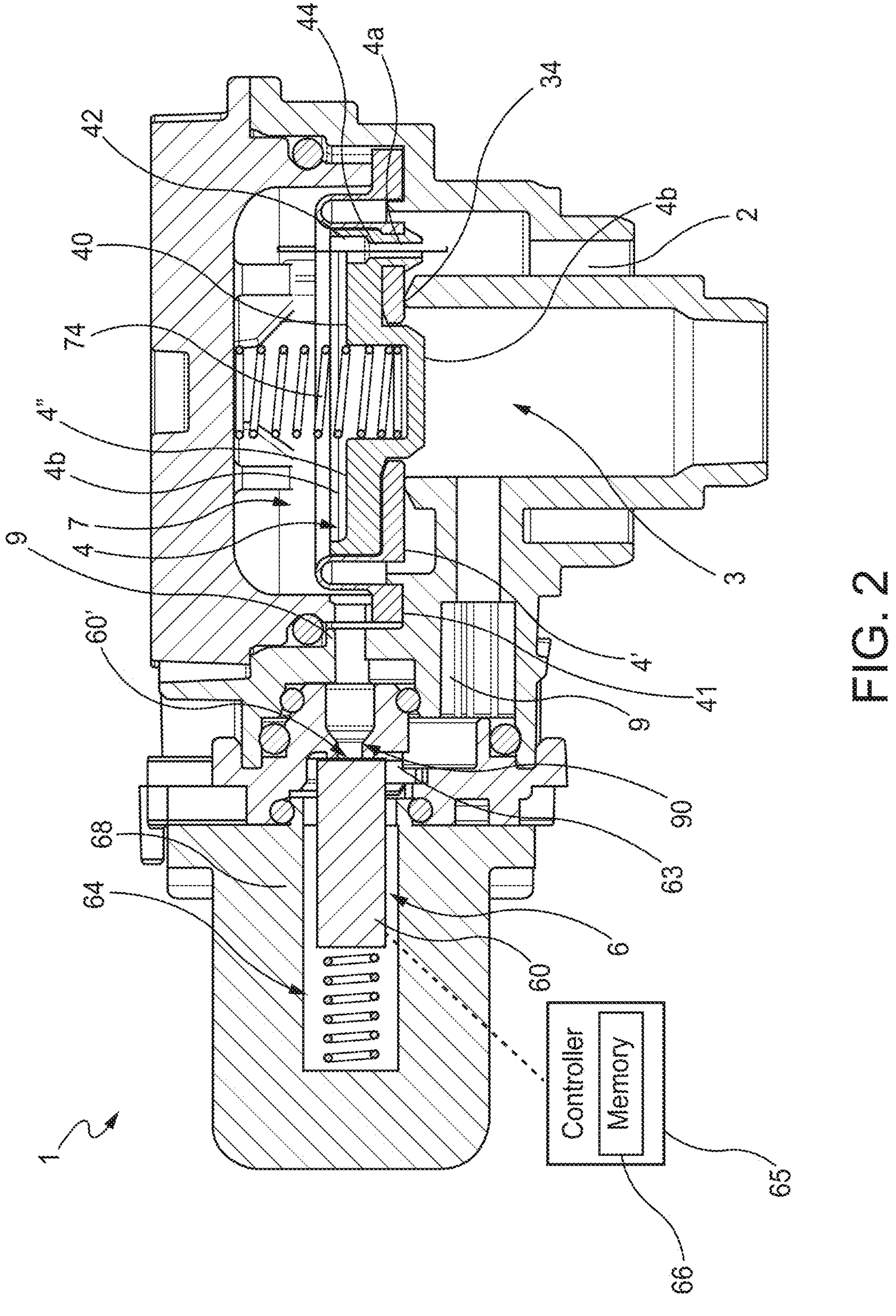
FIG. 2 illustrates a cross-section of an example valve device in a second operating mode.

FIG. 2 shows a cross-section of the valve device 1 of FIG. 1 operating in the second operating mode. The second operating mode may correspond to a user demand for a closed valve. As shown in FIG. 2, the solenoid 68 is not energised.

As discussed previously, the position of the armature 60 is determined by the balance of forces acting on the armature 60. As the solenoid 68 is not energised, there is no electromagnetic force of the solenoid acting on the armature 60. The reaction force of the coil spring 64 acts to move the armature 60 towards the armature seat 63. Fluid in the conduit 9 exerts an opposing force on a front surface 60' of the armature 60.

In FIG. 2, the valve device 1 is shown when the inlet pressure is less than a first threshold inlet pressure. When the inlet pressure is less than a first threshold inlet pressure, the opposing force of the fluid in the conduit 9 on the front surface 60' is less than the reaction force of the coil spring 64. In the absence of the electromagnetic force of the solenoid, the reaction force of the coil spring 64 overcomes the opposing force of the fluid in the conduit 9 to move the armature 60 towards the armature seat 63. As shown in FIG. 2, the front surface 60' of the armature 60 contacts the armature seat 63 such that there is no separation between the armature 60 and the armature seat 63. In this configuration, the actuator 6 is said to be in the closed actuator position.

In the closed actuator position, there is a seal between the front surface 60' of the armature 60 and the armature seat 63. This effectively blocks the conduit 9 and prevents fluid flow from the inlet 2 to the outlet 3 via the second flow path 52.

For added clarity, a portion of the second flow path 52 which is not fluidically connected to the inlet 2 is shown in grey (as opposed to black) in FIG. 2.

As shown, when the actuator 6 is in the closed actuator position, fluid flows into the chamber 7 via the channel 42 until the chamber pressure equals the inlet pressure. The valve device is configured such that the first effective area 4*a* on which the inlet pressure acts is less than the second effective area 4*b* on which the chamber pressure acts. Considering the forces acting on the valve member 4, when the chamber pressure equals the inlet pressure, the pressure differential force will be non-zero and act to bias the valve member 4 towards the valve seat 34 due to the difference between the first and second effective areas 4*a*, 4*b*. As shown in FIG. 2, the front surface 4' of the valve member 4 contacts the valve seat 34. In this state, the valve member 4 is said to be in the closed valve position.

When the valve member 4 is in the closed valve position, there is no gap between the front surface 4' of the valve member 4 and an end of the outlet 3 facing the valve member 4. As such, when the valve member 4 is in the closed valve position the inlet 2 is not fluidically connected to the outlet 3 via the first flow path 51.

The resilient force of the spring 74 further acts to bias the vale member 4 towards to the valve seat 34. This may ensure a complete seal the front surface 4' of the valve member 4 and the valve seat 34 preventing fluid ingress therebetween.

A portion of the first flow path 51 which is not fluidically connected to the inlet 2 is shown in grey (as opposed to black) in FIG. 2.

When the valve device 1 is in the second operating mode and the inlet pressure is less than the first threshold inlet pressure, the inlet 2 is not connected to the outlet 3 via the first flow path 51 or the second flow path 52. In this state, no fluid is output from the outlet 3.

Figure 3:
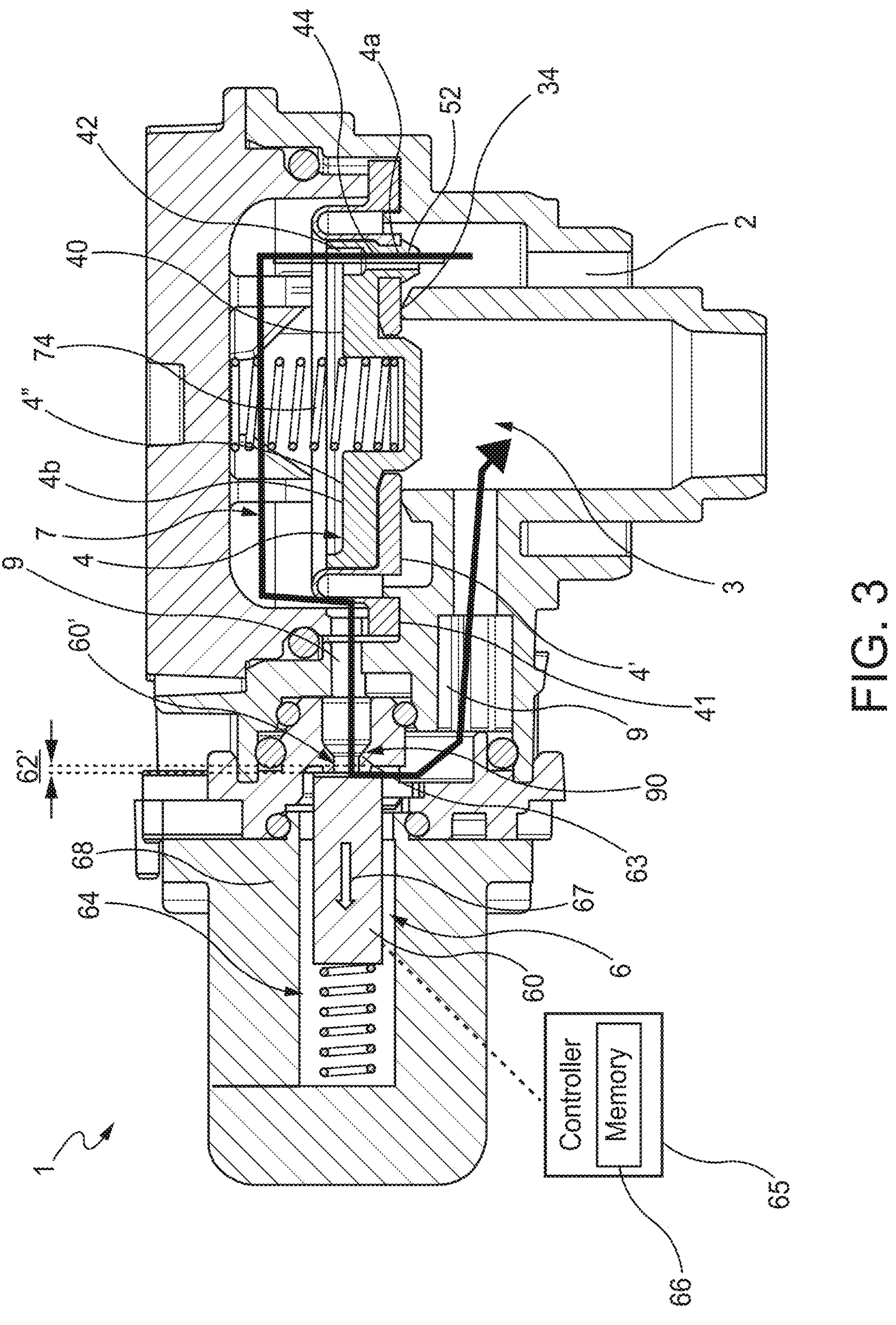
FIG. 3 illustrates a cross-section of an example valve device in a second operating mode.

FIG. 3 shows a cross-section of the valve device 1 operating in the second operating mode when the inlet pressure is greater than the first threshold inlet pressure. At this inlet pressure, the force of the fluid in conduit 9 acting on the front surface 60' of the armature 60 exceeds the reaction force of the coil spring 64. The coil spring 64 compresses, translating the armature 60 in a first direction (shown by a block arrow 67). In this state, the actuator 6 is said to be in a partially open actuator position. As such, even in the absence of the electromagnetic force of the solenoid 68, the armature 60 is not sealed against the armature seat 63.

When the actuator 6 is in the partially open actuator position, there is a gap between the front surface 60' of the armature 60 and the armature seat 63. This gap is termed 'small separation 62'', as it is smaller than the separation 62, which is formed when the actuator 6 is in the open actuator position. The small separation 62' partially unblocks the conduit 9 and enables fluid flow from the inlet 2 to the outlet 3 via the second flow path 52.

When the actuator 6 is in the partially open actuator position, the small separation 62' creates a bottleneck in the flow through the second flow path 52.

The small separation 62' has an effective cross-sectional area that is smaller than the minimum cross-sectional area of the channel 42 where fluid enters the second flow path 52. As a result, the chamber pressure behind the valve member 4 is approximately equal to the inlet pressure which acts on the front surface 4' of the valve member 4. As stated previously, the first effective area on which the inlet pressure acts is smaller than the second effective area on which the chamber pressure acts. Considering the forces acting on the valve member 4, when the chamber pressure equals the inlet pressure, the net pressure differential force will act to bias the valve member 4 towards the valve seat 34 (i.e., into the closed valve position). The resilient force of the spring 74 further acts to bias the vale member 4 towards to the valve seat 34. This may ensure a complete seal the front surface 4' of the valve member 4 and the valve seat 34 preventing fluid ingress therebetween.

When the valve member 4 is in the closed valve position, there is no gap between the front surface 4' of the valve member 4 and the end of the outlet 3 facing the valve member 4. As such, the inlet 2 is not fluidically connected to the outlet 3 via the first flow path 51.

As shown in FIG. 3, at this value of the inlet pressure, the inlet 2 is not connected to the outlet 3 via the first flow path 51 but the inlet 2 is connected to the outlet 3 via the second flow path 52. In this state, the only fluid output from the outlet 3 arrives via the second flow path 52.

In this way, the second flow path 52 may provide a pressure relief path to prevent damage to componentry when the inlet pressure exceeds the first threshold inlet pressure. The first threshold inlet pressure may represent a safety limit for the valve device 1.

The first threshold inlet pressure may be tuned though selection of the coil spring 64 of the actuator 6. Varying the relative spring constant of the coil spring 64 will vary the first threshold inlet pressure of the valve device 1. For example, increasing the spring constant of the coil spring 64 would increase the opposing force required to move the armature 60 away from the armature seat 63, thereby increasing the first threshold inlet pressure.

The first threshold inlet pressure may be tuned through selection of component parts of the valve device 1. For example, first threshold inlet pressure may be tuned by varying the cross-sectional area of the reduced area portion 90 of the conduit 9.

In FIG. 3, the valve device 1 is shown when the inlet pressure is greater than the first threshold inlet pressure and less than a second threshold inlet pressure. If the inlet pressure is increased beyond the second threshold inlet pressure, then the actuator 6 switches from the partially open actuator position to the open actuator position. This occurs due to the chamber pressure increasing in line with the inlet pressure until the second threshold inlet pressure is reached. As the chamber pressure increases, the associated force of the fluid in the conduit 9 acting on the front surface 60' of the armature 60 also increases. This acts to widen the small separation 62' between the armature 60 and the armature seat 63. When the inlet pressure exceeds the second threshold inlet pressure, the force of the fluid in the conduit 9 acting on the front surface 60' of the armature 60 is great enough to move the armature 60 further away from the armature seat 63. This switches the actuator 6 from the partially open actuator position into the open actuator position.

Figure 4:
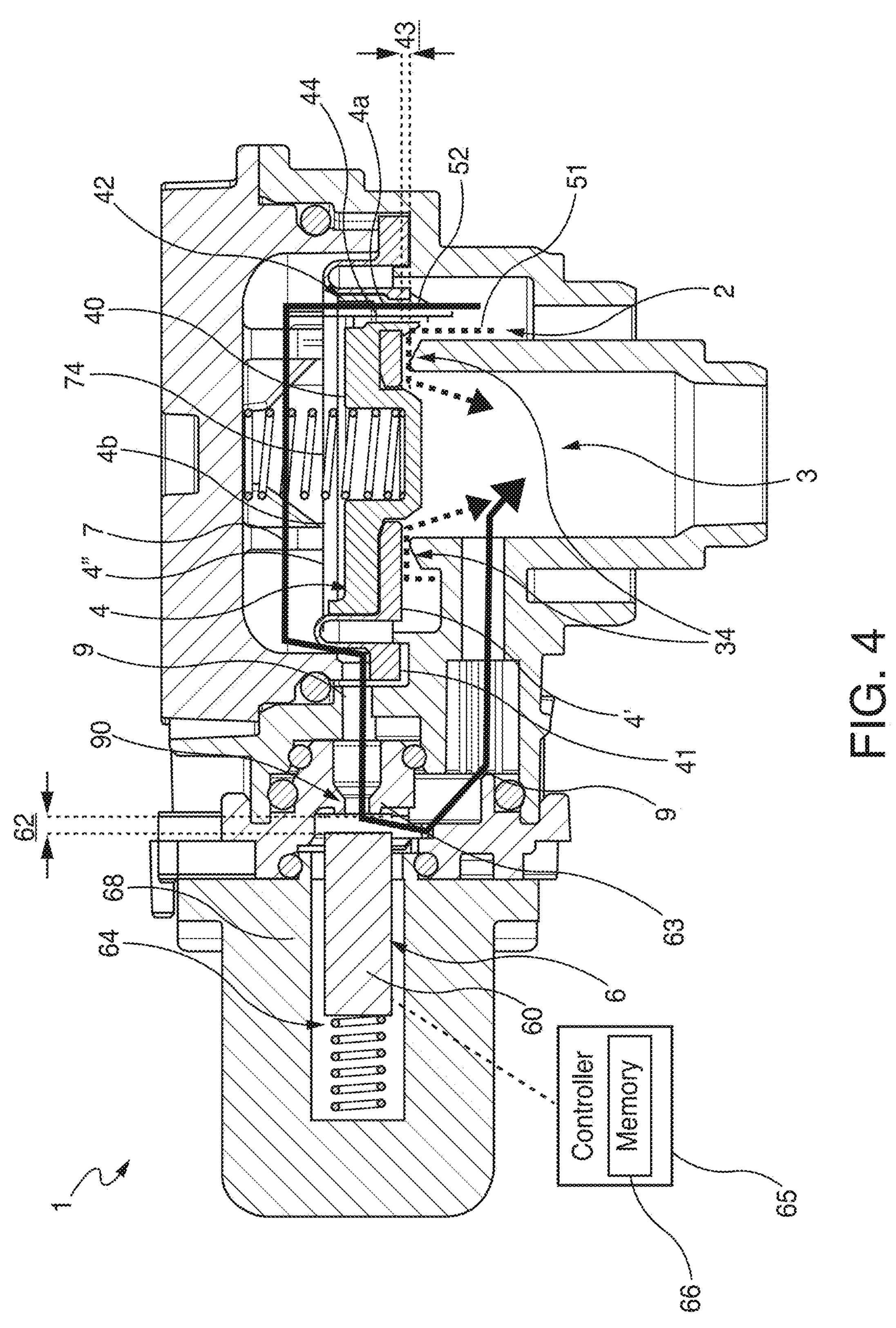
FIG. 4 illustrates a cross-section of an example valve device in a second operating mode.

FIG. 4 shows a cross-section of the valve device of FIG. 1 operating in a second operating mode when the inlet pressure is greater than the second threshold inlet pressure. As described in the preceding paragraph, when the inlet pressure is greater than the second threshold inlet pressure, the actuator 6 is in the open actuator position. In this position, there is the separation 62 between the front surface 60' of the armature 60 and the armature seat 63. The separation 62 enables fluidic connection between the inlet 2 and the outlet 3 via the second flow path 52.

The separation 62 is wide enough so as to not cause a bottleneck in flow along the second flow path 52. As the minimum cross-sectional area of the conduit 9 is larger than the minimum cross-sectional area of the channel 42, the chamber pressure behind the valve member 4 is less than the inlet pressure which acts on the front surface 4' of the valve member 4. This pressure imbalance acts to move the valve member 4 away from the valve seat 34. As a result, when the actuator 6 is in the open actuator position the valve member 4 is pushed into the open valve position. As such, the inlet 2 is fluidically connected to the outlet 3 via the first flow path 51.

As shown in FIG. 4, fluid is output from the outlet 3, travelling from the inlet 2 via the first flow path 51 and via the second flow path 52.

The second threshold inlet pressure may represent a further safety limit for the valve device 1. The second threshold inlet pressure may be tuned through selection of component parts of the valve device 1. For example, the second threshold inlet pressure may be tuned by varying the cross-sectional area of the reduced area portion 90 of the conduit 9 and/or varying the cross-sectional area of the further reduced area portion 44 of the channel 42.

Alternately or in addition, the second threshold inlet pressure may be tuned though selection of the coil spring 64 of the actuator 6. Varying the spring constant of the coil spring 64 will vary the second threshold inlet pressure of the valve device 1. For example, increasing the spring constant of the spring 64 would increase the opposing force required to move the armature away from the armature seat 63, thereby increasing the second threshold inlet pressure.

A further means for tuning the first or second threshold inlet pressure involves applying a small current to the solenoid 68 when the valve device 1 is in the second operating mode. In this context the term ‘small’ is used to denote that the magnitude of the small current is less than the magnitude of a current required to switch the fix the actuator in the open actuator position (as in the first operating mode of the valve device). A small positive current (i.e., in the same direction as the current through the solenoid 68 when the valve device 1 is in the first operating mode) reduces the first and second threshold inlet pressure. Similarly, a small reverse current increases the first and second threshold inlet pressure. The controller 65 may be configured to determine and apply such a small current or small reverse current as may be required for some or all operating conditions of the valve device 1.

Figure 5:
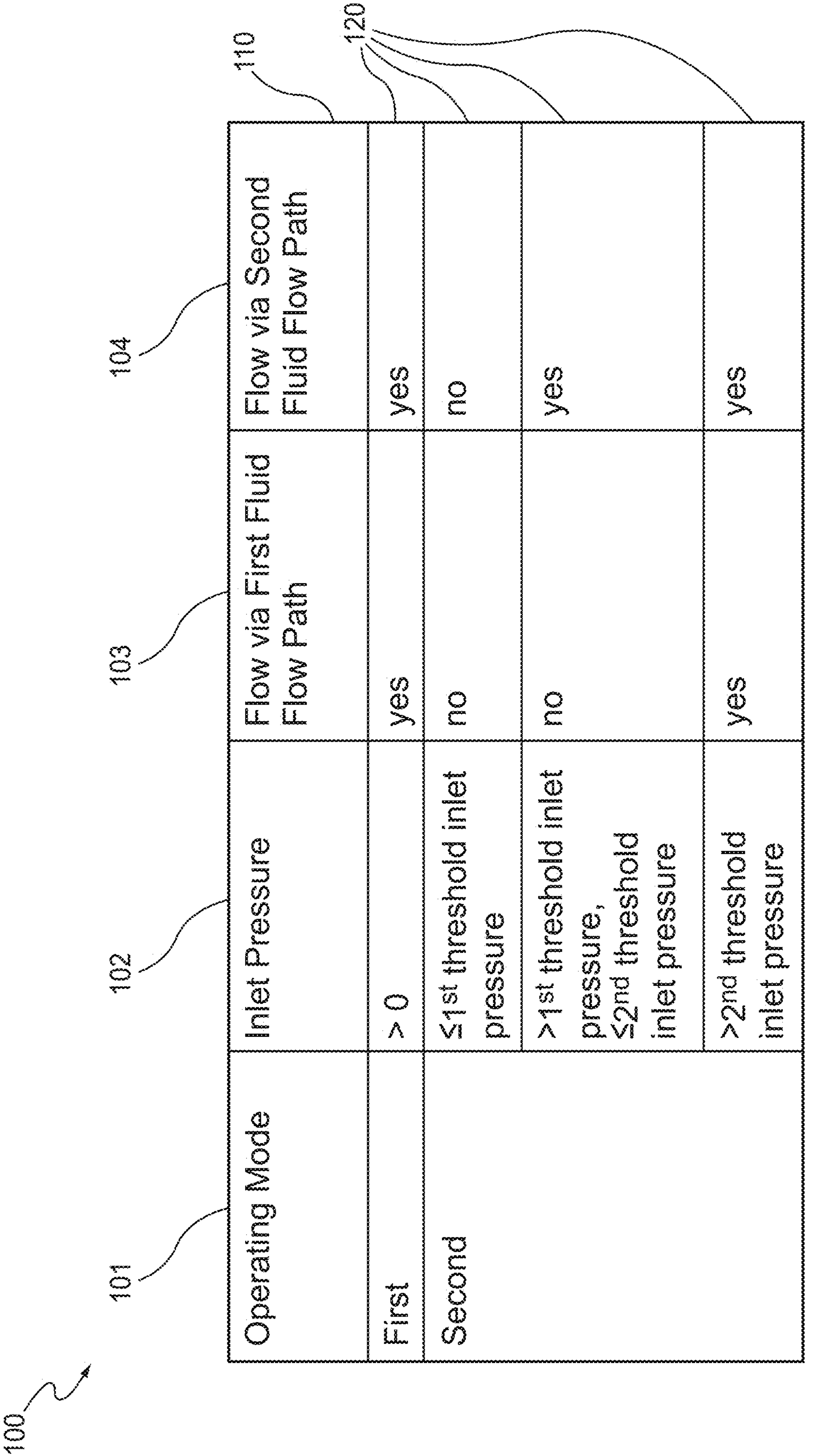
FIG. 5 illustrates a table of parameters representing outputs of an example valve device.

FIG. 5 shows a table 100 of parameters representing the outputs of the valve device 1 in various operating modes and inlet pressures. A first column 101 of the table 100 recites the operating mode of the valve device 1 as selected by the controller 65. In the first operating mode of the valve device 1 the solenoid 68 is energised such that the actuator is fixed in the open actuator position. In the second operating mode (e.g., the solenoid 68 is not energised).

A second column 102 of the table 100 recites the inlet pressure of the valve device 1. A third column 103 of the table 100 describes whether or not the inlet 2 is fluidically connected to the outlet 3 via the first flow path 51. Similarly, a fourth column 104 of the table 100 describes whether or not the inlet 2 is fluidically connected to the outlet 3 via the second flow path 52. For clarity, the table 100 includes a first row 110 which recites headings representative of each column 101-104. The table 100 further includes four further rows 120 which each represent data for various operating conditions of the valve device 1.

As shown in FIG. 5, when the valve device 1 is acting in the first operating mode, the outlet 3 is fluidically connected to the inlet 2 via the first flow path 51 and via the second flow path 52, regardless of the inlet pressure.

When the valve device 1 is acting in the second operating mode, the outlet 3 is fluidically connected to the inlet 2 via the second flow path 52 only when the inlet pressure is greater than the first threshold inlet pressure. In the second operating mode, the outlet 3 is fluidically connected to the inlet 2 via the first flow path 51 only when the inlet pressure is greater than the second threshold inlet pressure (which is greater than the first threshold inlet pressure).

As such, when the valve device 1 is in the second operating mode, the valve device 1 may still allow limited or substantial fluid flow from the inlet 2 to the outlet 3 depending on the inlet pressure of the valve device 1. This configuration allows the valve device 1 to safely expel fluid if the inlet pressure exceeds a pre-defined safety limit. In this way, the valve device 1 has a pressure relief system integrated therein.

When the valve device 1 is integrated into a fluid delivery device such as a showerhead, this may allow the fluid delivery device to be rated to a lower pressure and enable the use of lower grade materials in smaller amounts. In this way, implementing the valve device 1 with its integrated pressure relief system in the place of conventional solenoid valves may reduce the cost of producing the fluid delivery device.

Similarly, the pipework feeding the fluid delivery device may not need to be mains pressure rated. This may increase the installation flexibility of the fluid delivery device, as it may be suitable for a wider range of existing fittings.

Furthermore, such a fluid delivery device comprising the valve device 1 may have lower associated maintenance costs and/or a longer lifetime as high levels of pressure are unable to build up and cause damage to the fluid delivery device or upstream elements of a wider apparatus or system comprising the fluid delivery device. Such an arrangement may overcome an issue of conventional solenoid valves, wherein the solenoid valve may become stuck closed as pressure builds up. As such, the valve device 1 may be associated with reduced maintenance demands.

In the present disclosure, the pressure relief system is achieved by re-configuring the componentry of a solenoid valve. This utilises fewer components than would be present in a conventional solenoid valve that was used in combination with a conventional pressure relief valve. As such, the valve device 1 with its integrated pressure relief system may minimise complexity and associated cost of manufacture as compared with conventional means.

In the example valve device 1 described above in relation to FIGS. 1 to 5, the actuator 6 essentially consists of a monostable solenoid valve. That is to say that a continuous control signal is required to maintain one of the two actuator positions. In this example, the actuator is configured such that the solenoid 68 must be energised to maintain the actuator open position. In an alternate embodiment, the actuator may essentially consist of a bi-stable solenoid valve (i.e., a continuous control signal is not required to maintain either of the two actuator positions). Such an alternate actuator may utilise one or more permanent magnets to hold the armature back against the force of the coil spring (in the open actuator position). The solenoid being energised to switch between the first and second operating mode of the valve device and vice versa but ultimately not required to maintain the operating mode thereafter. Such an alternative may have the benefit of lower power consumption during prolonged use.

In this alternative embodiment, the first operating mode of the valve device is characterised in that the armature is fixed in position by one or more permanent magnets (i.e., acting against the force of the coil spring) such that the actuator is fixed in the open actuator position regardless of the inlet pressure. The second operating mode of the valve device is characterised in that the armature is positioned such that the force of the coil spring exceeds the force of the one or more permanent magnets such that the actuator is not fixed in the open actuator position and is instead able to move depending on the inlet pressure.

Figure 6:
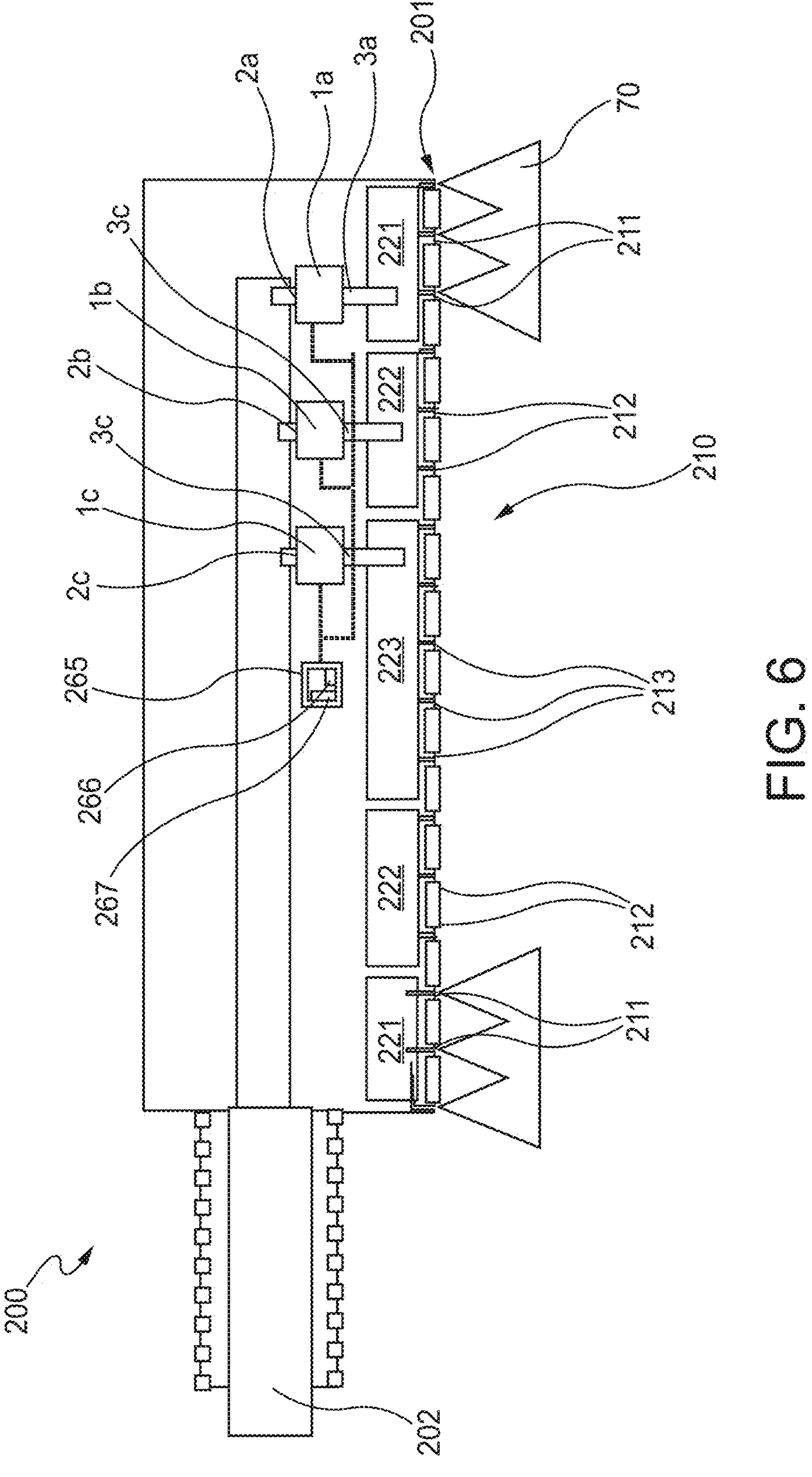
FIG. 6 illustrates a cross-section of an example spray head.

FIG. 6 shows a cross-section of a spray head 200. In this example, the spray head 200 is a showerhead. The spray head 200 comprises three valve devices, each valve device of the three valve devices is equivalent to the valve device 1 of FIGS. 1 to 5. The explanations pertaining to FIGS. 1 to 5 therefore apply in analogous manner to FIG. 6. Reference numerals will be repeated for identical or analogous elements described in relation the valve device 1. Such references will receive a suffix (a, b or c) to denote which of the three valve devices they relate to. The three valve devices include a first valve device 1*a*, a second valve device 1*b* and a third valve device 1*c*. As described in the preceding description, each of the three valve devices 1*a*-1*c* includes a respective inlet 2*a*-2*c* for receiving fluid from a fluid supply. Each of the three valve devices 1*a*-1*c* also includes one of three outlets 3*a*-3*c* including a first outlet 3*a*, a second outlet 3*b* and a third outlet 3*c*. Each of the three outlets 3*a*-3*c* is selectively fluidically connected to the respective inlet 2*a*-2*c* corresponding to that one of the three valve devices 1*a*-1*c*.

As shown in FIG. 6, the spray head 200 includes a spray head inlet 202 configured to be fluidically connected to a fluid supply pipe (not shown). In this example, the spray head inlet 202 is threaded to enable coupling to a fluid supply pipe. The spray head inlet 202 is configured to supply fluid from the fluid supply pipe to each of the inlets 2*a*-2*c*.

The spray head 200 further comprises a spray face 201 which includes a plurality of spray head outlets 210 comprising a first set of spray head outlets 211, a second set of spray head outlets 212 and a third set of spray head outlets 213. In this example, the spray head 200 comprises: a first chamber 221 configured to supply fluid to the first set of spray head outlets 211; a second chamber 222 configured to supply fluid to the second set of spray head outlets 212; and a third chamber 223 configured to supply fluid to the third set of spray head outlets 213. The second chamber 222 is substantially annular in shape and arranged to at least partially surround the third chamber 223. Similarly, the first chamber 221 is substantially annular in shape and arranged to at least partially surround the second chamber 222. The third set of spray head outlets 213 is located in a centre of the spray face 201 while the first set of spray head outlets 211 is disposed around a perimeter of the spray face 201. The second set of spray head outlets 212 is arranged on the spray face 201 between the first set of spray head outlets 211 and the third set of spray head outlets 213 such that the third set of spray head outlets 213 is encircled by the second set of spray head outlets 212 and the second set of spray head outlets 212 is encircled by the first set of spray head outlets 211.

The spray head 200 is configured such that the first outlet 3*a* is arranged to supply fluid to the first chamber 221 with the first valve device 2*a* being operable to selectively allow fluid communication between the inlet 2*a* of the first valve device 1*a* and the first set of spray head outlets 211. Similarly, the second outlet 3*b* is arranged to supply fluid to the second chamber 222 with the second valve device 1*b* being operable to selectively allow fluid communication between the inlet 2*b* of the second valve device 1*b* and the second set of spray head outlets 212. The third outlet 3*c* is arranged to supply fluid to the third chamber 223 with the third valve device 1*c* being operable to selectively allow fluid communication between the inlet 2*c* of the third valve device 1*c* and the third set of spray head outlets 213.

The three valve devices 1*a*-1*c* share a common controller 265. The common controller 265 has the same features as the controller 65 of FIGS. 1-5. The common controller 265 is operable to control switching between the first operating mode and the second operating mode of each of the three valve devices 1*a*-1*c*. In this example, the common controller 265 is a digital controller that is completely enclosed within the spray head 200.

The common controller 265 includes a memory 266 operable to store operating mode switching data for each of the three valve devices 1*a*-1*c*. For example, the switching data may represent a pattern of switching over time. Each pattern may be associated with a different spray mode of the spray head 200. The controller 265 may be operable to select a pattern on the basis of additional data such as temperature, time of day and/or identification data. For example, the common controller 265 may be programmed to run a specific switching pattern when a specific user has been identified and a specific spray mode has been selected. The controller 265 also includes a power source 267 for powering the common controller 265. The power source 267 may be an energy storage device such as a battery and/or may include a generator such as a turbine system.

The common controller 265 may be operably connected to a user interface (not shown) by wired or wireless means. For example, the user interface may be a touchpad operable for user selection between a variety of spray modes of the spray head 200. Each spray mode available to select on the user interface may represent a different combination of operating modes of the three valve devices 1*a*-1*c*.

In FIG. 6, the spray head 200 is shown with the first valve device 1*a* operating in the first operating mode. In the first operating mode, the solenoid of the first valve device 1*a* is energised. As such, the first outlet 3*a* and by extension the first set of spray head outlets 211 output flow from the spray head inlet 202. Fluid output from the first set of spray head outlets 211 is represented in FIG. 6 by triangles 70.

The second valve device 1*b* and the third valve device 1*c* are operating in the second operating mode (i.e., the solenoids of the second valve device 1*b* and the third valve device 1*c* are not energised). As the inlet pressure for each of these valve devices 1*b*-1*c* is less than the first threshold inlet pressure, fluid is not supplied to the second set of spray head outlets 212 or the third set of spray head outlets 213.

Figure 7:
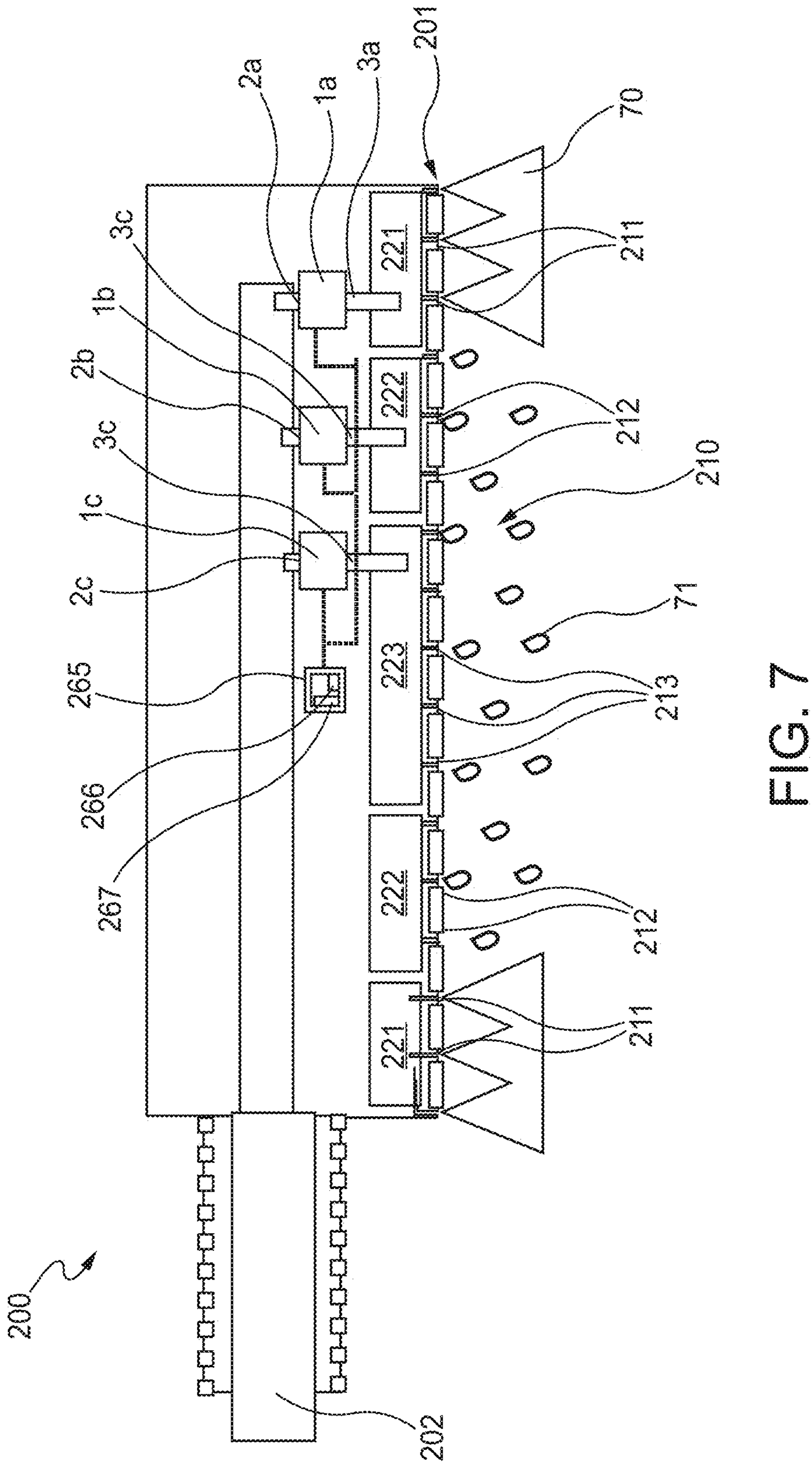
FIG. 7 illustrates a cross-section of an example spray head.

FIG. 7 shows the spray head 200 when the inlet pressure exceeds the first threshold inlet pressure but is less than the second threshold inlet pressure. As in FIG. 6, the first valve device 1*a* is operating in the first operating mode while each of the second valve device 1*b* and the third valve device 1*c* are operating in the second operating mode.

As the inlet pressure exceeds the first threshold inlet pressure, the second valve device 1*b* and the third valve device Ic enable the second inlet 2*b* and the third inlet 2*c* to be fluidically connected to the second outlet 3*b* and the third outlet 3*c* respectively. This fluidic connection will only be via the second flow paths of the second valve device 1*b* and the third valve device 1*c*. As such, fluid output from the second and third set of spray head outlets 212, 213 will be limited as the first flow paths of the second valve device 1*b* and the third valve device 1*c* are sealed. The limited fluid output from the second and third set of spray head outlets 212, 213 is represented in FIG. 7 by droplets 71. Fluid output from the first set of spray head outlets 211 is represented in FIG. 7 by triangles 70.

Figure 8:
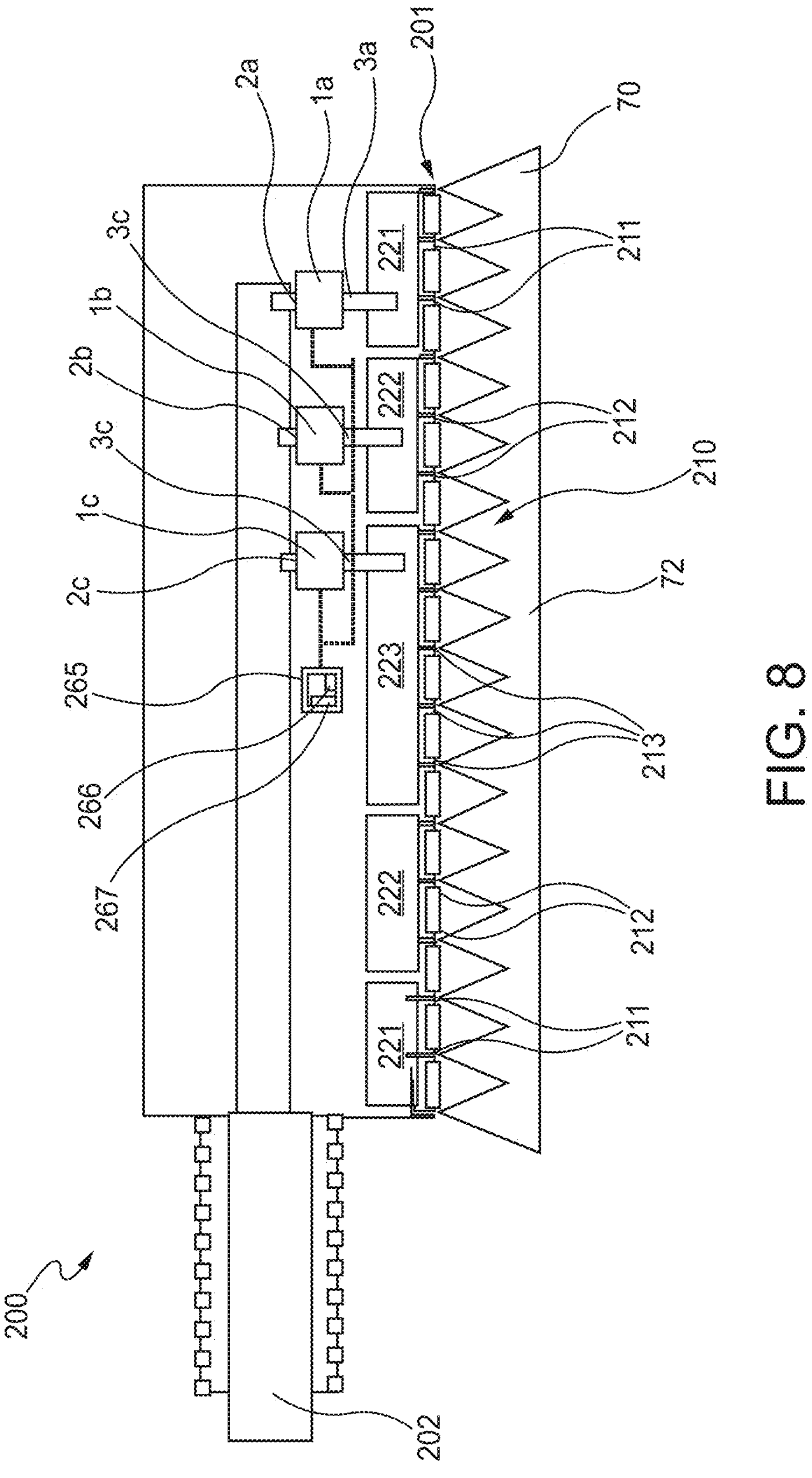
FIG. 8 illustrates a cross-section of n example spray head.

FIG. 8 shows the spray head 200 when the inlet pressure exceeds the second threshold inlet pressure. As in FIGS. 6 and 7, the first valve device 1*a* is operating in the first operating mode while each of the second valve device 1*b* and the third valve device 1*c* are operating in the second operating mode.

As the inlet pressure exceeds the second threshold inlet pressure, the second valve device 1*b* will enable the second inlet 2*b* to be fluidically connected to the second outlet 3*b* via its first flow path and its second flow path. Similarly, the third valve device 1*c* will enable the third inlet 2*c* to be fluidically connected to the third outlet 3*c* via its first flow path and its second flow path.

As such, the rate of fluid output from the second and third set of spray head outlets 212, 213 will be significantly greater than in FIG. 7. This is because, in FIG. 8, both the first flow paths and the second flow paths of the second and third valve devices 1*b*-1*c* are unsealed.

The fluid output from the second and third set of spray head outlets 212, 213 is represented in FIG. 8 by triangles 72. Fluid output from the first set of spray head outlets 211 is represented in FIG. 8 by triangles 70.

Turning to consider FIGS. 6-8, it can be seen that as the inlet pressure increases the spray head 200 compensates by allowing more of the plurality of spray head outlets 210 to become available for fluid output. In this way, the spray head 200 may generate a range of different spray conditions for each user selected spray mode.

In this example, each of the three valve devices 1*a*-1*c* are identical having the same first threshold inlet pressure and the same second threshold inlet pressure. However, it is considered within the scope of this disclosure that a spray head may contain any number of valve devices each with the same or different inlet pressure switching thresholds.

Figure 9:
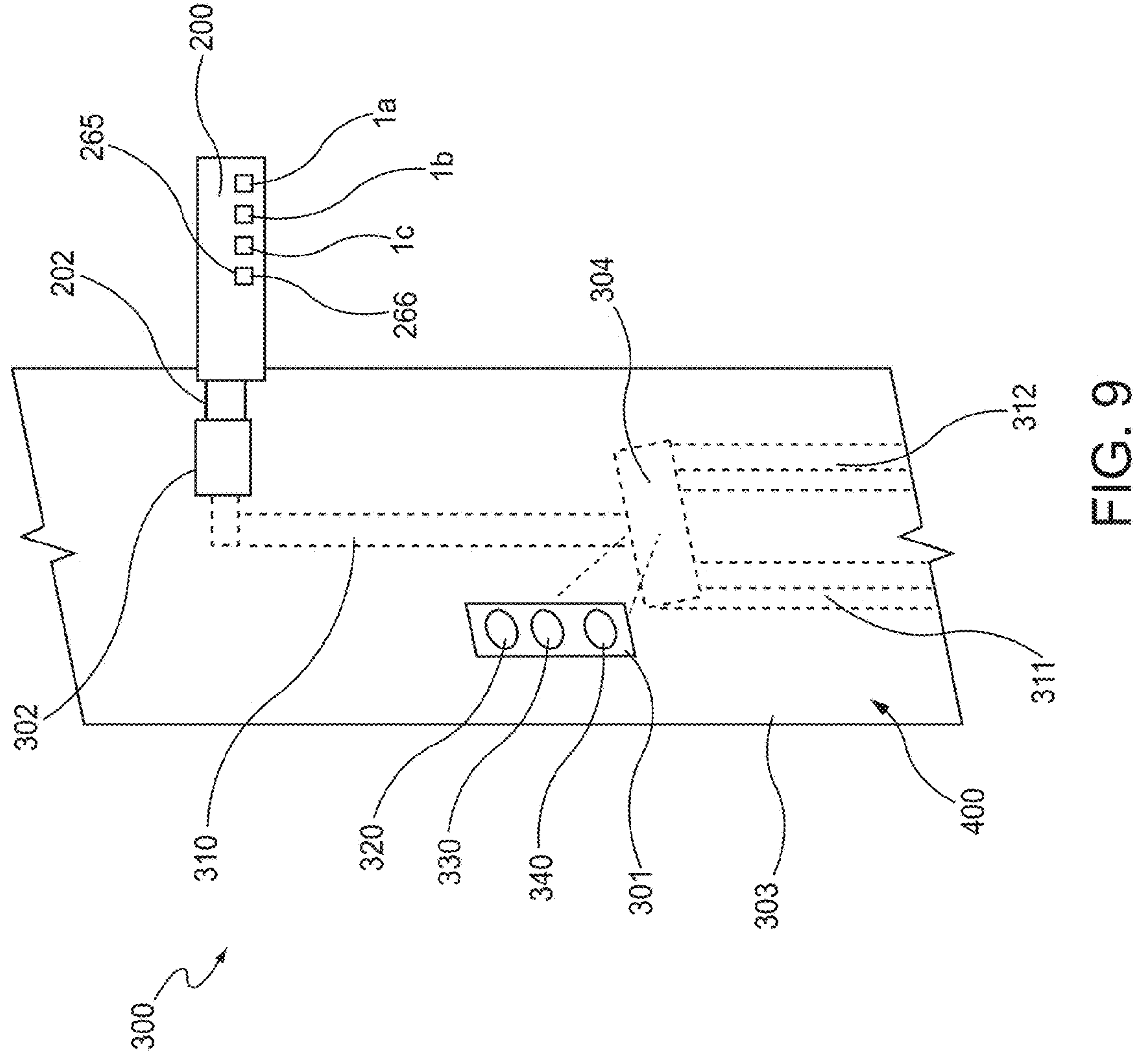
FIG. 9 illustrates a system for installation in an ablutionary environment.

FIG. 9 shows a system 300 such as an ablutionary system for installation in an ablutionary environment 400. The system 300 includes the spray head 200 of FIGS. 6-8. The system 300 further includes a fluid supply pipe 310 and a connector 302.

As shown in FIG. 9, the spray head inlet 202 is connected to the fluid supply pipe 310 via the connector 302. In this example, the spray head inlet 202 is threadingly coupled to the connector 302.

Part of the system 300 may be disposed behind a panel 303 of the ablutionary environment (e.g., a shower panel wall). Features that are positioned behind the panel 303 are shown in FIG. 9 using dashed lines.

The system 300 comprises a user interface 301 for a user to vary the flow rate from the fluid supply to the spray head 200. The system 300 further comprises a mixing valve 304 operable to control the relative supply provided to the fluid supply pipe 301 by each of a hot fluid supply pipe 311 and cold fluid supply pipe 312 (fluidically connected to a hot and a cold fluid source respectively). The user interface 301 is operably connected to, e.g. electrically connected to, the mixing valve 304 to enable user actuation of the mixing valve 304.

The user interface 301 is wirelessly connected to and operable to control the common controller 265. The system 300 further comprises a sensor 320 configured to transmit sensor data to the user interface 301. In this example, the sensor 320 includes a touch sensor integrated into the user interface 301 to enable user selection between spray modes of the spray head 200. The sensor data may include one or more types of data. For example, the sensor data may include user identity information, ambient temperature measurements, temperature measurements for flow incoming and/or outgoing from the mixing valve 304.

The user interface 301 includes a processor 330 and a system memory 340 operable to store spray mode data. The processor 330 is configured to use sensor data and data from the system memory 340 to select a spray mode for the spray head 200. The processor 340 is configured to send a signal to the common controller 265 indicative of the operating mode requirements for each of the three valve devices 1*a*-1*c* required to produce the selected spray mode.

In the example shown in FIGS. 6-9, the spray head 200 is described as comprising the common controller 266. However, it is considered within the scope of this disclosure that the common controller 266 or any part thereof may be remote from the spray head and may optionally be integrated into the user interface.

In the example shown in FIGS. 6-9, the spray head 200 is described as comprising three valve devices (each with an associated chamber and set of spray head outlets). However, a person skilled in the art will understand that the spray head may comprise any number of valve devices. Alternate configurations of spray head outlets and chambers are also considered within the scope of this disclosure. For example, multiple valve devices may be associated with a same individual chamber or set of outlets such that each valve device does not have a unique associated chamber and set of spray head outlets.

A first aspect provides a valve device for use in a fluid delivery device such as in an ablutionary or plumbing apparatus, comprising: an inlet for receiving, in use, fluid from a fluid supply, the fluid having an inlet pressure; an outlet selectively fluidically connected to the inlet; a valve member having an open valve position wherein the valve member enables fluidic connection between the inlet and the outlet, and a closed valve position wherein the valve member does not enable fluidic connection between the inlet and the outlet; and an actuator, for selectively actuating the valve member, having an open actuator position and a closed actuator position, wherein the valve device is operable over a range of operating values of the inlet pressure including a first threshold inlet pressure and a second threshold inlet pressure, wherein the valve device has: a first operating mode in which, over a whole of the range of operating values of the inlet pressure, the actuator is fixed in the open actuator position and the valve member is in the open valve position; and a second operating mode in which the actuator switches from the closed actuator position to the open actuator position, switching the valve member from the closed valve position to the open valve position, when the inlet pressure exceeds the second threshold inlet pressure.

The actuator may be operable to selectively actuate the valve member from the open valve position to the closed valve position by (indirectly) varying a fluid pressure differential across the valve member.

The first operating mode may correspond to a user demand for an open valve.

The second operating mode may correspond to a user demand for a closed valve.

The first threshold inlet pressure may be lower than the second threshold inlet pressure.

The valve device may be configured such that, when the valve device is operating in the second operating mode, the actuator switches from the closed actuator position to a partially open actuator position, when the inlet pressure exceeds the first threshold inlet pressure.

The valve device may be configured such that when the actuator is in the partially open actuator position: there is at least partial fluidic connection between the inlet and the outlet; and the valve member is in the closed valve position.

The inlet may be selectively fluidically connected to the outlet via a first flow path.

The inlet may be selectively fluidically connected to the outlet via a second flow path.

The valve device may further comprise a valve seat operable to cooperate with a front surface of the valve member to (reversibly) seal the first flow path.

Either or both of the inlet and the outlet may be generally tubular. The inlet may have a central axis (termed an inlet axis) which extends along a length of the inlet. Similarly, the outlet may have a central axis (termed an outlet axis) which extends along a length of the outlet. The front surface of the valve member may be substantially perpendicular to the inlet axis and/or the outlet axis.

The inlet and/or the outlet may have any suitable cross-section (measured perpendicular to the inlet axis and outlet axis respectively). For example, the inlet may have a generally circular cross-section while the outlet may have a generally square cross-section.

The inlet may have an annular shape.

The inlet may surround a circumference of the outlet.

The outlet may have an annular shape.

The outlet may surround a circumference of the inlet.

An end of the outlet facing the front surface of the valve member and/or an end of the inlet facing the front surface of the valve member may define the valve seat.

The valve device may be configured such that when the valve member is in the closed valve position a front surface of the valve member is seated on a valve seat such that there is no fluidic connection between the inlet and the outlet via the first flow path.

The valve device may be configured such that when the valve member is in the open valve position the valve member is separated from the valve seat such that the inlet is fluidically connected to the outlet via the first flow path.

The valve member may comprise a translatable plate supported around its perimeter by a flexible sheet.

The valve device may comprise a chamber. The chamber may contact a rear surface of the valve member opposite the front surface. The rear surface of the valve member may define a boundary of the chamber.

Fluid within the chamber may be characterised as having a 'chamber pressure' which represents a fluidic pressure of fluid within the chamber.

The valve device may be configured such that the inlet pressure acts on a first effective area (e.g., of the front surface) of the valve member resulting in an inlet pressure force.

The valve device may be configured such that the chamber pressure acts on a second effective area (e.g., of the rear surface) of the valve member resulting in a chamber pressure force which acts to oppose the inlet pressure force.

The valve device may be configured such that the first effective area is less than the second effective area.

The valve device may comprise at least one resilient member, e.g. at least one spring. The resilient member may comprise a spring which extends across the chamber.

The valve member may comprise a channel that fluidically connects the inlet to the chamber. The channel may comprise or consist of an aperture which perforates the valve member.

The valve device may comprise a conduit which is operable to selectively fluidically connect the chamber to the outlet. The channel, the chamber and the conduit may define the second flow path.

The conduit may comprise a reduced area portion. The reduced area portion may be configured to reduce a rate of flow along the second flow path. The reduced area portion may have a minimum cross-sectional area of the conduit.

The channel may comprise a further reduced area portion. The further reduced area portion may have a minimum cross-sectional area of the channel.

The reduced area portion may have a larger cross-sectional area than the further reduced area portion.

The valve device may be configured such that when the actuator is in the open actuator position, the minimum cross-sectional area of the conduit is larger than the minimum cross-sectional area of the channel.

The valve device may be configured such that when the actuator is in the partially open actuator position, the minimum cross-sectional area of the conduit is less than or equal to the minimum cross-sectional area of the channel.

The valve device may be configured such that: when the actuator is in the closed actuator position there is no fluidic connection between the inlet and the outlet via the second flow path; and/or when the actuator is in the closed actuator position there is no fluidic connection between the inlet and the outlet via the first flow path; and/or when the valve member is in the open actuator position the inlet is fluidically connected to the outlet via the second flow path; and/or when the valve member is in the open actuator position the inlet is fluidically connected to the outlet via the first flow path.

The actuator may comprise an armature. The armature may comprise, or consist essentially of, a moveable element arranged to selectively block and unblock the conduit. The armature may be operably connected to a resilient member such as a spring. The armature may be electromagnetically controlled.

The actuator may comprise an armature seat. The armature seat may be operable to cooperate with a front surface of the armature to (reversibly) seal the second flow path.

The actuator may comprise a solenoid operable to oppose a reaction force of the resilient member on the armature (when the solenoid is energised).

The actuator may comprise, or consist essentially of, a mono-stable solenoid valve. The actuator may be configured such that a continuous control signal is required to maintain one of the two actuator positions. For example, the actuator may be configured such that the solenoid must be energised to maintain the actuator open position.

The valve device may be configured such that when the valve device is operating in the first operating mode, the solenoid is energised and an electromagnetic force of the solenoid on the armature overcomes the reaction force separating the armature and the armature seat. This may enable fluidic connection between the inlet and the outlet via the second flow path.

The valve device may be configured such that when the valve device is in the second operating mode and the inlet pressure is below the first threshold inlet pressure the actuator is in the closed actuator position, wherein the resilient member urges the armature to contact the armature seat, thereby sealing the second flow path preventing fluidic connection between the inlet and the outlet via the second flow path.

The actuator may comprise, or consist essentially of, a bi-stable solenoid valve. The actuator may be configured such that a continuous control signal is not required to maintain either of the two actuator positions.

The actuator may comprise one or more permanent magnets operable to hold the armature back against the force of the coil spring when the actuator is in the open actuator position. The actuator may be operable to switch between the first and second operating mode of the valve device (and vice versa) when a current is applied to the solenoid.

Each of the one or more permanent magnets may be arranged to oppose the reaction force of the resilient member.

The actuator may be configured such that when the valve device is in the first operating mode, the armature is fixed in position by the one or more permanent magnets such that the actuator is fixed in the open actuator position over the whole range of operating values of the inlet pressure. This may enable fluidic connection between the inlet and the outlet via the second flow path.

The actuator may be configured such that when the valve device is in the second operating mode the armature is positioned such that the reaction force of the resilient member exceeds the force of the one or more permanent magnets such that the actuator is not fixed in the open actuator position and is instead able to move depending on the inlet pressure.

The valve device may be configured such that when the valve device is in the second operating mode and the inlet pressure is greater than the first threshold inlet pressure and less than or equal to the second threshold inlet pressure, a pressure of fluid in the second flow path on the armature opposes the reaction force and induces a first separation between the armature and the armature seat enabling at least partial fluidic connection between the inlet and the outlet via the second flow path.

The valve device may be configured such that when the valve device is in the second operating mode and the inlet pressure is greater than the second threshold inlet pressure, the pressure of fluid in the second flow path on the armature overcomes the reaction force of the resilient member such that there is a second separation between the armature and the armature seat. The second separation may enable fluidic connection between the inlet and the outlet via the second flow path. The second separation may be larger than the first separation. The second separation may have an effective cross-sectional area that is larger than the minimum cross-sectional area of the channel. In use, this arrangement may create a fluid pressure differential across the valve member which acts to switch the valve member into the open valve position.

The valve device may comprise a controller operably connected to the actuator and operable to control switching between the first operating mode and the second operating mode of the valve device.

The controller may be connected to the actuator by wired or wireless means.

The controller may be operable to control switching of the position of the actuator between the open actuator position and the closed actuator position.

The controller may be operable to control switching of the position of the actuator between the open actuator position, the partially open actuator position and the closed actuator position.

The controller may be operable to control switching of the position of the actuator dependent on the inlet pressure.

The controller may be operable to vary a flow rate supplied to the inlet thereby varying the inlet pressure. As such, the controller may comprise two separate means through which the operating positions of the valve member and the actuator may be controlled. For example, a first means may utilise the solenoid to switch the operating mode of the actuator (thereby indirectly affecting the position of the valve member at a given inlet pressure as described elsewhere in this application). A second means may involve varying the flow rate supplied to the inlet, directly controlling the inlet pressure which determines the position of the valve member for a given operating mode of the valve device (as described elsewhere in this application).

The controller may be a digital controller or a manual controller such as a push button.

The controller may comprise a memory operable to store operating mode switching data.

Operating mode switching data may include one or more patterns of switching between operating modes of the valve device over time. For example, the controller may be configured to provide a Pulse Width Modulating signal to the actuator to produce a first pattern of switching between operating modes of the valve device.

Each pattern may be associated with a different spray mode of a fluid delivery device such as an ablutionary or plumbing apparatus in which the valve device may be installed.

The controller may be operable to select a pattern on the basis of additional data such as temperature, time of day and/or identification data. For example, the controller may be programmed to run a specific switching pattern when a specific user has been identified and a specific spray mode has been selected.

The controller may include a means for tuning the first and/or second threshold inlet pressure. For example, the controller may be programmed to apply a small current to the solenoid when the valve device is in the second operating mode. In this context the term ‘small’ is used to denote that the magnitude of the small current is less than the magnitude of a current required to fix the actuator in the open actuator position (as in the first operating mode of the valve device). Applying a small positive current may reduce the first and second threshold inlet pressure. Similarly, applying a small reverse current may increases the first and second threshold inlet pressure. The controller may be configured to determine and apply such a small current or small reverse current as may be required for some or all operating conditions of the valve device.

A second aspect provides a fluid delivery device comprising: at least one valve device according to the first aspect; a fluid delivery device inlet configured to be fluidically connected to a fluid supply pipe; at least one set of fluid delivery device outlets configured to receive fluid from the fluid supply pipe via the outlet of one of the at least one valve devices.

The fluid delivery device may comprise a spray head, for an ablutionary fitting. The fluid delivery device may comprise, or consist essentially of, a showerhead or a faucet.

The fluid delivery device may comprise a plurality of valve devices according to the first aspect.

The fluid delivery device may comprise a plurality of sets of fluid delivery device outlets. Each set of fluid delivery device outlets (of the plurality of sets of fluid delivery device outlets) may be configured to receive fluid from the outlet of a respective one of the plurality of valve devices.

The plurality of valve devices may each have the same first threshold inlet pressure and/or the same second threshold inlet pressure as the others of the plurality of valve devices.

Alternately, a selection of the plurality of valve devices may have a different first threshold inlet pressure to a remainder of the plurality of valve devices.

A further selection of the plurality of valve devices may have a different second threshold inlet pressure to a remainder of the plurality of valve devices.

The selection of the plurality of valve devices may or may not consist of the further selection of the plurality of valve devices.

As such, the fluid delivery device may contain any number of valve devices each with the same or different inlet pressure switching thresholds.

The fluid delivery device may comprise a controller operably connected to the actuator and operable to control switching between the first operating mode and the second operating mode of the valve device.

The controller may be connected to the actuator by wired or wireless means.

The controller may be operable to control switching of the position of the actuator between the open actuator position and the closed actuator position.

The controller may be operable to control switching of the position of the actuator between the open actuator position, the partially open actuator position and the closed actuator position.

Switching the position of the actuator may be dependent on the inlet pressure.

The controller may be a digital controller or a manual controller such as a push button.

The controller may comprise a memory operable to store operating mode switching data.

Operating mode switching data may include one or more patterns of switching between modes over time.

Each pattern may be associated with a different spray mode of the spray head.

The controller may be operable to switch between the first operating mode and the second operating mode of each of the plurality of valve devices.

The controller may be operable to vary a flow rate supplied to each inlet thereby varying the inlet pressure for each respective inlet. The controller may be operable to vary a flow rate supplied to each inlet independently from all other inlets of the plurality of valve devices, thereby varying the inlet pressure independently for each inlet of the plurality of valve devices.

The controller may be at least partially received within the spray head.

The controller may be completely enclosed within the spray head.

The controller may be operable to select a pattern on the basis of additional data such as temperature, time of day and/or identification data. For example, the controller may be programmed to run a specific switching pattern when a specific user has been identified and a specific spray mode has been selected.

A third aspect provides an ablutionary system, for installation in an ablutionary environment, comprising: a fluid delivery device according to the second aspect; and a user interface for controlling one or more characteristics of flow from the fluid supply pipe to the fluid delivery device.

The one or more characteristics of flow may include the flow rate and/or temperature of flow.

The user interface may comprise the controller where present.

The user interface may be operably connected to the controller (where present) e.g., by wired or wireless means.

The user interface may be remote from the spray head such that no part of the user interface is received within the spray head.

The system may further comprise a mixing valve operable to control fluid supply provided to the spray head from each of a hot fluid supply pipe and a cold fluid supply pipe. The user interface may be operably connected to the mixing valve to enable user actuation of the mixing valve.

The system may comprise one or more sensors. One or more of the sensors may be configured to transmit sensor data to the user interface. For example, each sensor may be configured to transmit sensor data to the user interface.

For example, the one or more sensors may include a touch sensor integrated into the user interface. The touch sensor may enable user selection between spray modes of the spray head.

The sensor data may include one or more types of data. For example, the sensor data may include user identity information, ambient temperature measurements, temperature measurements for flow incoming and/or outgoing from the mixing valve.

The user interface may include a processor and a system memory operable to store spray mode data. The processor may be configured to use sensor data and data from the system memory to select a spray mode for the spray head. The processor may be configured to send a signal to the controller. The signal may be indicative of the operating mode requirements for each of the one or more valve devices required to produce the selected spray mode.

The person skilled in the art will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

The specific configurations shown in the figures and described in the accompanying description are examples and should not be considered as limiting.

Throughout the disclosure, the term cross-sectional area is used to refer to the cross-sectional area of a hollow element, such as a pipe or channel. This term should be taken to mean the cross-sectional area of the element measured perpendicular to the direction of flow (in use) through the element at the location of the measurement.

This disclosure is intended to be read such that any separable features or elements of the disclosed invention, in any of its various aspects and embodiments, should be viewed as intended to be combinable unless the context clearly dictates otherwise.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A valve device comprising:

an inlet for receiving fluid from a fluid supply, the fluid having an inlet pressure;

an outlet selectively fluidically connected to the inlet;

a valve member having an open valve position wherein the inlet is in fluid communication with the outlet, and a closed valve position wherein the inlet is not in fluid communication with the outlet; and an actuator selectively actuating the valve member, the actuator having an open actuator position and a closed actuator position, wherein the valve device is operable over a range of operating values of the inlet pressure including a first threshold inlet pressure and a second threshold inlet pressure, wherein the valve device has:

a first operating mode in which, over a whole of the range of operating values of the inlet pressure, the actuator is in the open actuator position and the valve member is in the open valve position, wherein there is a fluidic connection between the inlet and each of a first flow path and a second flow path; and a second operating mode in which:

when the inlet pressure is less than or equal to the first threshold inlet pressure, the actuator is in the closed actuator position and the valve member is in the closed valve position, and there is no fluidic connection between the inlet and either of the first flow path or the second flow path;

when the inlet pressure exceeds the first threshold inlet pressure and is less than or equal to the second threshold inlet pressure, the actuator is in a partially open actuator position and the valve member is in the closed valve position, and there is a fluidic connection between the inlet and the second flow path but no fluidic connection between the inlet and the first flow path; and when the inlet pressure exceeds the second threshold inlet pressure, the actuator is in the open actuator position and the valve member is in the open valve position, and there is a fluidic connection between the inlet and each of the first flow path and the second flow path.

2. The valve device of claim 1, wherein the first threshold inlet pressure is lower than the second threshold inlet pressure and wherein when the valve device is in the second operating mode, the actuator switches from the closed actuator position to the partially open actuator position when the inlet pressure exceeds the first threshold inlet pressure.

3. The valve device of claim 2, wherein when the actuator is in the partially open actuator position and the valve member is in the closed valve position, there is at least a partial fluidic connection between the inlet and the outlet via the fluidic connection between the inlet and the second flow path.

4. The valve device of claim 1, further comprising a controller controlling switching between the first operating mode and the second operating mode of the valve device.

5. The valve device of claim 4, wherein the controller controls switching of the position of the actuator dependent on the inlet pressure.

6. The valve device of claim 5, wherein the valve member includes a translatable plate supported around its perimeter by a flexible sheet and/or wherein the valve device includes a resilient member.

7. The valve device of claim 1, wherein the actuator includes an armature seat, an armature operably connected to a resilient member, and a solenoid selectively opposing a reaction force of the resilient member on the armature when the solenoid is energised.

8. The valve device of claim 7, wherein when the valve device is operating in the first operating mode, either:

the solenoid is energised and an electromagnetic force of the solenoid on the armature overcomes the reaction force separating the armature and the armature seat enabling fluidic connection between the inlet and the outlet via the second flow path; or the armature is fixed in position by one or more permanent magnets enabling fluidic connection between the inlet and the outlet via the second flow path.

9. The valve device of claim 8, wherein when the valve device is in the second operating mode:

when the inlet pressure is below the first threshold pressure, the actuator is in the closed actuator position wherein the resilient mechanism urges the armature to contact the armature seat thereby sealing the second flow path preventing fluidic connection between the inlet and the outlet via the second flow path; and when the inlet pressure exceeds the first threshold pressure and is less than or equal to the second threshold pressure, a pressure of fluid in the second fluid flow path on the armature opposes the reaction force and induces a first separation between the armature and the armature seat enabling at least partial fluidic connection between the inlet and the outlet via the second flow path.

10. The valve device of claim 9, wherein when the valve device is in the second operating mode and the inlet pressure exceeds the second threshold pressure, the pressure of fluid in the second fluid flow path on the armature overcomes the reaction force of the resilient mechanism such that there is a second separation between the armature and the armature seat, the second separation being larger than the first separation and enabling fluidic connection between the inlet and the outlet via the second flow path.

11. The valve device of claim 1, wherein:

when the valve member is in the closed valve position, a front surface of the valve member is seated on a valve seat such that there is no fluidic connection between the inlet and the outlet via the first flow path; and when the valve member is in the open valve position, the valve member is separated from the valve seat such that the inlet is fluidically connected to the outlet via the first flow path.

12. The valve device of claim 11, wherein one of the inlet and the outlet surround a circumference of the other of the inlet and the outlet and wherein an end of the outlet facing the front surface of the valve member and/or an end of the inlet facing the front surface of the valve member define the valve seat.

13. The valve device of claim 1, further comprising a chamber which contacts a rear surface of the valve member opposite the front surface, and a channel that fluidically connects the inlet to the chamber.

14. The valve device of claim 13, further comprising a conduit which selectively fluidically connects the chamber to the outlet, wherein the channel, the chamber and the conduit define the second flow path.

15. The valve device of claim 14, wherein when the actuator is in the open actuator position, the minimum cross-sectional area of the conduit is larger than the minimum cross-sectional area of the channel.

16. The valve device of claim 14, wherein the conduit includes a reduced area portion to reduce a rate of flow along the second fluid flow path, the reduced area portion of the conduit having a larger cross-sectional area than the minimum cross-sectional area of the channel.

17. The valve device of claim 1, wherein:

when the actuator is in the closed actuator position there is no fluidic connection between the inlet and the outlet via the second flow path; and when the actuator is in the open actuator position the inlet is fluidically connected to the outlet via the second flow path.

18. A fluid delivery device comprising:

at least one valve device including:

an inlet;

an outlet selectively fluidically connected to the inlet;

a valve member having an open valve position wherein the inlet is in fluid communication with the outlet, and a closed valve position wherein the inlet is not in fluid communication with the outlet; and an actuator selectively actuating the valve member, the actuator having an open actuator position and a closed actuator position, wherein the valve device is operable over a range of operating values of an inlet pressure including a first threshold inlet pressure and a second threshold inlet pressure, wherein the valve device has:

a first operating mode in which, over a whole of the range of operating values of the inlet pressure, the actuator is in the open actuator position and the valve member is in the open valve position, wherein there is a fluidic connection between the inlet and each of a first flow path and a second flow path; and a second operating mode in which:

when the inlet pressure is less than or equal to the first threshold inlet pressure, the actuator is in the closed actuator position and the valve member is in the closed valve position, and there is no fluidic connection between the inlet and either of the first flow path or the second flow path;

when the inlet pressure exceeds the first threshold inlet pressure and is less than or equal to the second threshold inlet pressure, the actuator is in a partially open actuator position and the valve member is in the closed valve position, and there is a fluidic connection between the inlet and the second flow path but no fluidic connection between the inlet and the first flow path; and when the inlet pressure exceeds the second threshold inlet pressure, the actuator is in the open actuator position and the valve member is in the open valve position, and there is a fluidic connection between the inlet and each of the first flow path and the second flow path;

a fluid delivery device inlet fluidically connected to a fluid supply pipe; and at least one set of fluid delivery device outlets receiving fluid from the fluid supply pipe via the outlet of one of the at least one valve devices.

19. The fluid delivery device of claim 18, comprising:

a plurality of valve devices;

a plurality of sets of fluid delivery device outlets, wherein each set of fluid delivery device outlets receives fluid from the outlet of a respective one of the plurality of valve devices.

20. The fluid delivery device of claim 18, wherein a controller is at least partially received within the fluid delivery device.

21. The fluid delivery device of claim 20, wherein the controller is a digital controller and/or wherein the controller includes a memory operable to store operating mode switching data for each of the plurality of valve devices.

22. The fluid delivery device of claim 18, wherein a controller is operably connected to the actuator to control switching between the first operating mode and the second operating mode of one or more valve devices.

23. An ablutionary system comprising:

a fluid delivery device comprising:

at least one valve device including:

an inlet;

an outlet selectively fluidically connected to the inlet;

a valve member having an open valve position wherein the inlet is in fluid communication with the outlet, and a closed valve position wherein the inlet is not in fluid communication with the outlet; and an actuator selectively actuating the valve member, the actuator having an open actuator position and a closed actuator position, wherein the valve device is operable over a range of operating values of an inlet pressure including a first threshold inlet pressure and a second threshold inlet pressure, wherein the valve device has:

a first operating mode in which, over a whole of the range of operating values of the inlet pressure, the actuator is in the open actuator position and the valve member is in the open valve position, wherein there is a fluidic connection between the inlet and each of a first flow path and a second flow path; and a second operating mode in which:

when the inlet pressure is less than or equal to the first threshold inlet pressure, the actuator is in the closed actuator position and the valve member is in the closed valve position, and there is no fluidic connection between the inlet and either of the first flow path or the second flow path;

when the inlet pressure exceeds the first threshold inlet pressure and is less than or equal to the second threshold inlet pressure, the actuator is in a partially open actuator position and the valve member is in the closed valve position, and there is a fluidic connection between the inlet and the second flow path but no fluidic connection between the inlet and the first flow path; and when the inlet pressure exceeds the second threshold inlet pressure, the actuator is in the open actuator position and the valve member is in the open valve position, and there is a fluidic connection between the inlet and each of the first flow path and the second flow path;

a fluid delivery device inlet fluidically connected to a fluid supply pipe; and at least one set of fluid delivery device outlets receiving fluid from the fluid supply pipe via the outlet of one of the at least one valve devices; and a user interface for controlling one or more characteristics of flow from the fluid supply pipe to the fluid delivery device, wherein the user interface is operably connected to a controller.

24. The ablutionary system of claim 23, further comprising a mixing valve controlling fluid supply provided to the fluid delivery device from each of a hot fluid supply pipe and cold fluid supply pipe, wherein the user interface is operably connected to the mixing valve to enable user actuation of the mixing valve.

* * * * *